(12) United States Patent
Yuan et al.

(10) Patent No.: US 8,554,011 B2
(45) Date of Patent: Oct. 8, 2013

(54) AUTOMATIC EXPOSURE CORRECTION OF IMAGES

(75) Inventors: Lu Yuan, Beijing (CN); Jian Sun, Beijing (CN)

(73) Assignee: Microsoft Corporation, Redmond, WA (US)

( * ) Notice: Subject to any disclaimer, the term of this patent is extended or adjusted under 35 U.S.C. 154(b) by 243 days.

(21) Appl. No.: 13/155,202

(22) Filed: Jun. 7, 2011

(65) Prior Publication Data

US 2012/0314971 A1 Dec. 13, 2012

(51) Int. Cl.
*G06K 9/40* (2006.01)

(52) U.S. Cl.
USPC .......... 382/274; 382/260; 382/275; 358/3.26; 358/3.27

(58) Field of Classification Search
USPC ............... 382/260, 274, 275; 358/3.26, 3.27, 358/463
See application file for complete search history.

(56) References Cited

U.S. PATENT DOCUMENTS

| | | | |
|---|---|---|---|
| 5,703,644 A | 12/1997 | Mori et al. | |
| 6,393,162 B1 | 5/2002 | Higurashi | |
| 6,995,791 B2 * | 2/2006 | Skow | 348/223.1 |
| 7,023,484 B2 | 4/2006 | Watanabe | |
| 7,327,506 B2 * | 2/2008 | Yui | 358/527 |
| 7,463,296 B2 * | 12/2008 | Sun et al. | 348/254 |
| 7,602,987 B2 * | 10/2009 | Kuramoto | 382/254 |
| 7,813,545 B2 | 10/2010 | Ovsiannikov | |
| 8,035,600 B2 * | 10/2011 | Hsu et al. | 345/98 |
| 2005/0201634 A1 | 9/2005 | Yuan et al. | |
| 2010/0091176 A1 | 4/2010 | Cha et al. | |

OTHER PUBLICATIONS

Akvis Enhancer 11, retrieved on Jan. 4, 2011 at <<http://www.xentrik.net/software/akvis_enhancer.html>>, 2 pages.

Battiato et al., "Automatic Image Enhancement by Content Dependent Exposure Correction," retrieved at <<http://www.dmi.unict.it/~battiato/download/JASPbattiato_official.pdf>>, EURASIP Journal on Applied Signal Processing 2004:12, 1849-1860, (c) 2004 Hindawi Publishing Corporation, 12 pages.

Bhukhanwala et al., "Automated Global Enhancement Digitzed Photographs," retrieved at <<http://ieeexplore.ieee.org/stamp/stamp.jsp?tp=&arnumber=273657>>, IEEE (c) 1994, 10 pages.

Brajovic, "Brightness Perception, Dynamic Range and Noise: A Unifying Model for Adaptive Image Sensors," retrieved at <<http://ieeexplore.ieee.org/stamp/stamp.jsp?tp=&arnumber=1315163>>, Proceedings of the 2004 IEEE Computer Society Conference on Computer Vision and Pattern Recognition, (c) 2004, 8 pages.

(Continued)

*Primary Examiner* — Yosef Kassa
(74) *Attorney, Agent, or Firm* — Lee & Hayes, PLLC

(57) ABSTRACT

Techniques for automatic exposure correction of images are provided. In particular, the exposure of an input image may be improved by automatically modifying a non-linear function that characterizes the luminance of shadow, mid-tone, and highlight portions of the image. The input image may be segmented into a number of regions and each region is assigned a zone, where the zone indicates a specified range of luminance values. An initial zone assigned to a region of the image may be changed in order to reflect an optimal zone of the region. Based, in part, on the optimal zones for each region of the image, luminance modification parameters may be calculated and applied to the non-linear function in order to produce a modified version of the input image that improves the appearance of overexposed and/or underexposed regions of the input image.

20 Claims, 7 Drawing Sheets

(56) References Cited

OTHER PUBLICATIONS

Canny edge detector, retrieved on Jul. 14, 2011 at <<http://en.wikipedia.org/wiki/Canny_operator>>, Wikipedia.
Dale et al., "Image Restoration using Online Photo Collections," retrieved at <<http://ieeexplore.ieee.org/stamp/stamp.jsp?tp=&arnumber=5459473>>, 2009 IEEE 12th International Conference on Computer Vision (ICCV), (d) 2009, 8 pages.
Dynamic Range Compression Preserving Local Image Contrast, retrieved on Jan. 5, 2011 at <<http://www.wikipatents.com/GB-Patent-2417381/dynamic-range-compression-preserving-local-image-contrast>>, 10 pages.
Felzenszwalb et al., "Efficient Graph-Based Image Segmentation," retrieved at <<http://people.cs.uchicago.edu/~pff/papers/seg-ijcv.pdf>>, International Journal of Computer Vision, vol. 59, No. 2, (c) 2004, 26 pages.
Guo et al., "Correcting Over-Exposure in Photographs," retrieved at <<http://ieeexplore.ieee.org/stamp/stamp.jsp?tp=&arnumber=5540170>>, IEEE (c) 2010, 7 pages.
He et al., "Guided Image Filtering," retrieved at <<http://research.microsoft.com/en-us/um/people/jiansun/papers/GuidedFilter_ECCV10.pdf>>, Lecture Notes in Computer Science, 2010, vol. 6311/2010, 14 pages.
Histogram equalization, retrieved on Jul. 14, 2011 at <<http://en.wikipedia.org/wiki/Histogram_equalization>>, Wikipedia.
Ilstrup et al., "One-Shot Optimal Exposure Control," retrieved from <<http://users.soe.ucsc.edu/~manduchi/papers/eccv2010final.pdf>>, Lecture Notes in Computer Science, 2010, vol. 6311/2010, 14 pages.
Jobson et al., "Properties and Performance of a Center/Surround Retinex," retrieved at <<http://ieeexplore.ieee.org/stamp/stamp.jsp?tp=&arnumber=557356>>, IEEE Transactions on Image Processing, vol. 6, No. 3, Mar. 1997, 12 pages.
Kang et al., "Personalization of Image Enhancement," retrieved at <<http://ieeexplore.ieee.org/stamp/stamp.jsp?tp=&arnumber=5539850>>, IEEE (c) 2010, 8 pages.
Lee et al., "Dynamic Range Compression Based on Statistical Analysis," retrieved at <<http://ieeexplore.ieee.org/stamp/stamp.jsp?tp=&arnumber=5414419>>, (c) IEEE 2009, 4 pages.
Lischinski et al., "Interactive Local Adjustment of Tonal Values," retrieved at <<http://webcache.googleusercontent.com/search?q=cache:PKhlppGFKxQJ:citeseerx.ist.psu.edu/viewdoc/download%3Fdoi%3D10.1.1.89.3828%26rep%3Drep1%26type%3Dpdf+Interactive+local+adjustment+of+tonal+values&cd=4&hl=en&ct=clnk&gl=uk>>, SIGGRAPH '06, New York, NY, (c) 2006, 11 pages.
Mukherjee et al., "Enhancement of Color Images by Scaling the DCT Coefficients," retrieved at <<http://ieeexplore.ieee.org/stamp/stamp.jsp?tp=&arnumber=4623236>>, IEEE Transactions on Image Processing, vol. 17, No. 10. Oct. 2008, 12 pages.
Nayar et al., "Adaptive Dynamic Range Imaging: Optical Control of Pixel Exposures Over Space and Time," retrieved at <<http://ieeexplore.ieee.org/stamp/stamp.jsp?tp=&arnumber=1238624>>, Proceedings of the Ninth IEEE International Conference on Computer Vision (ICCV'03), (c) 2003, 8 pages.
Razlighi et al., "Correction of Over-Exposed Images Captured by Cell-Phone Cameras," retrieved at <<http://ieeexplore.ieee.org/stamp/stamp.jsp?arnumber=04382199>>, IEEE (c) 2006, 6 pages.
Reinhard et al., "Photographic Tone Reproduction for Digital Images," retrieved at <<http://www.cs.utah.edu/~reinhard/cdrom/tonemap.pdf>>, ACM (c) 2002, 10 pages.
Safonov et al., "Automatic correction of amateur photos damaged by backlighting," retrieved at <<http://www.graphicon.ru/2006/fe13_24_Safonov.pdf>>, International Conference Graphicon, 2006, Novosibirsk Akademgorodok, Russia, 10 pages.
Shimizu et al., "A New Algorithm of Exposure Control Based on Fuzzy Logic for Vido Cameras," retrieved at <<http://ieeexplore.ieee.org/stamp/stamp.jsp?arnumber=00697244>>, IEEE (c) 1992, 2 pages.
Skiden, "Automatic Exposure Correction and Local Contrast Setting for Diagnostic Viewing of Medical X-ray Images," retrieved at <<http://liu.diva-portal.org/smash/get/diva2:320764/FULLTEXT01>>, May 10, 2010, 66 pages.
Sobol, "Improving the Retinex algorithm for rendering wide dynamic range photographs," retrieved at <<http://osa.braveline.com/rmosa/sobol.pdf>>, Journal of Electronic Imaging 13(1), 65-74, Jan. 2004, 10 pages.
Sun et al., "Dynamic Contrast Enhancement based on Histogram Specification," retrieved at <<http://ieeexplore.ieee.org/stamp/stamp.jsp?tp=&arnumber=1561859>>, IEEE Transactions on Consumer Electronics, vol. 51, No. 4, Nov. 2005, 6 pages.
Tutorials: Photoshop Curves, retrieved on Jul. 14, 2011 at <<http://www.cambridgeincolour.com/tutorials/photoshop-curves.htm>>, Cambridge in Colour.
Tutorials: Photoshop Levels, retrieved on Jul. 14, 2011 at <<hhttp://www.cambridgeincolour.com/tutorials/levels.htm>>, Cambridge in Colour.
Using Adobe Photoshop CS5, retrieved on Jul. 14, 2011 at <<http://help.adobe.com/en_US/photoshop/cs/using/photoshop_cs5_help.pdf>>, last updated Jun. 21, 2011, Adobe, 623 pages.
Viola et al., "Rapid Object Detection using a Boosted Cascade of Simple Features," retrieved at <<http://ieeexplore.ieee.org/stamp/stamp.jsp?tp=&arnumber=990517>>, IEEE (c) 2001, 8 pages.
Yang et al., "Face detection for automatic exposure control in handheld camera," retrieved at <<http://ieeexplore.ieee.org/stamp/stamp.jsp?tp=&arnumber=1578705>>, Proceedings of the Fourth IEEE International Conference on Computer Vision Systems (ICVS 2006), (c) 2006, 8 pages.
Zone System, retrieved on Jul. 14, 2011 at <<http://en.wikipedia.org/wiki/Zone_system>>, Wikipedia.

* cited by examiner

AUTOMATIC EXPOSURE CORRECTION OF IMAGES

BACKGROUND

The quality of an image can depend, to a certain extent, on the exposure of the image. The exposure of an image may depend on lighting associated with the objects of the image, operation of an image capture device utilized to capture the image, and so forth. When an image includes overexposed and/or underexposed regions, details of objects included in the image may be lost, colors may be washed out, and the like.

In some cases, attempts have been made to control exposure based on metering techniques applied by the image capture device when images are taken. For example, a user of an image capture device may select a particular metering technique that the image capture device uses to measure the amount of light in a scene and calculate an exposure value before an image of the scene is captured. However, a certain level of expertise is required to select a proper metering technique to use in capturing images and, in some situations, photo opportunities may be lost while a user is deciding which metering technique to use to capture the image. Additionally, the image capture device may automatically apply certain metering techniques, but due to the complicated nature of the lighting associated with some images, the image capture device may apply a metering technique that results in overexposure and/or underexposure of certain portions of the image.

Additionally, some individuals may manually attempt to correct the exposure of an image using software after the image has been captured. To illustrate, image modification applications may allow an individual to manually adjust a non-linear curve characterizing the luminance of shadow, mid-tone, and highlight regions of the image. A particular amount of skill is needed in order to correct exposure of images in this way and performing manual correction of multiple images in this manner can be time consuming and inconvenient.

SUMMARY

This disclosure describes automatic exposure correction of images. In particular, a computing device may improve the exposure of an input image by automatically modifying a non-linear function that characterizes the luminance of shadow, mid-tone, and highlight portions of the image. In a particular implementation, the input image is segmented into a number of regions and each region is assigned a zone, where the zone indicates a specified range of luminance values. The zone may be one of a plurality of zones with each respective zone indicating a range of luminance values on a scale of luminance values. In some cases, the initial zone assigned to a region of the image may be changed in order to reflect an optimal zone of the region. Based, in part, on the optimal zones for each region of the image, luminance modification parameters may be calculated and applied to the non-linear function in order to produce a modified version of the input image that improves the appearance of overexposed and/or underexposed regions of the input image. The luminance modification parameters may be applied to the non-linear function to push the luminance values of the regions of the image to the luminance values associated with the respective optimal zones of the regions. Additional techniques may be applied to the modified image in order to reduce artifacts, such as the halo effect, overamplified dark or bright tones, and so on.

By applying the techniques described herein, the exposure of images may be improved automatically after an image has been captured. Thus, manual adjustment of the exposure of the image may be minimized or eliminated. Additionally, the time and skill needed to produce images with corrected overexposed and underexposed regions is minimized. Accordingly, a user's experience with an image capture device and/or an exposure correction application utilizing the techniques described herein is improved.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to the accompanying Figures. In the Figures, the left-most digit(s) of a reference number identifies the Figure in which the reference number first appears. The use of the same reference numbers in different Figures indicates similar or identical items or features.

DETAILED DESCRIPTION

Figure 1:
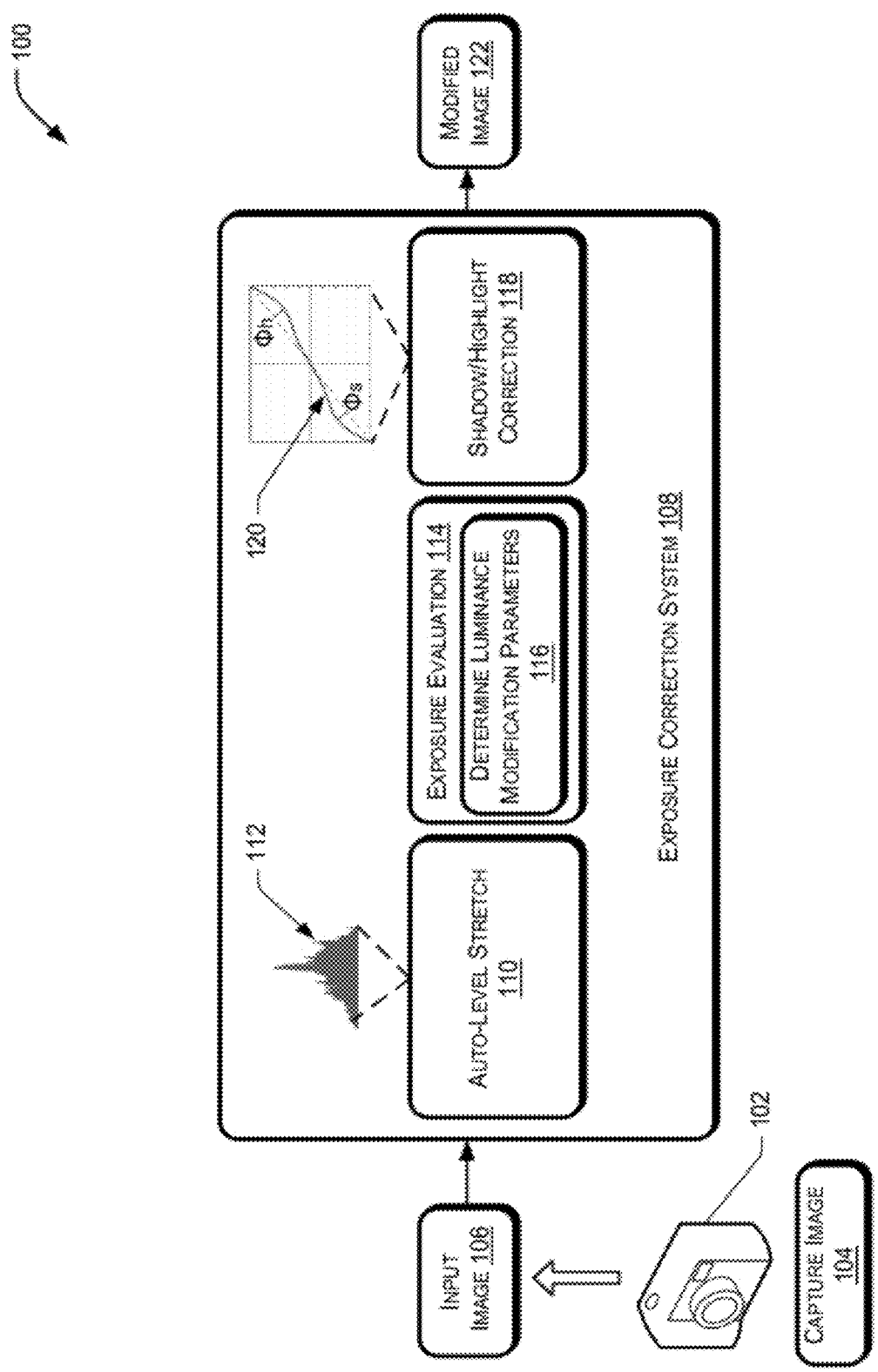
FIG. 1 illustrates a framework to correct the exposure of an image by determining luminance modification parameters and applying the luminance modification parameters to a non-linear function that characterizes the luminance of an image in the shadow, mid-tone, and highlight regions of the image.

FIG. 1 illustrates a framework 100 to correct the exposure of an image by determining luminance modification parameters and applying the luminance modification parameters to a non-linear function that characterizes the luminance of the image in the shadow, mid-tone, and highlight regions of the image. In particular, the framework 100 includes an image capture device 102. The image capture device 102 may include a digital camera, a phone, a tablet computer, a laptop computer, a portable gaming device, a portable media player, a personal digital assistant (PDA), another computing device including a camera, or a combination thereof.

At 104, the image capture device 102 may be operated by a user (not shown) to capture an image and to produce an input image 106. The input image 106 may be electronic data that represents a scene, objects, etc. viewed by the user of the image capture device 102 via a viewfinder or display of the image capture device 102. The input image 106 may be captured by the activation of a button or other input device associated with the image capture device 102. The input image 106 may be a black and white image, a color image, a sepia toned image, an image with additional types of toning applied, or combinations thereof.

The input image 106 may be provided to an exposure correction system 108 that can modify the input image 106 in order to improve the appearance of the input image 106. Specifically, the exposure correction system 108 may be configured to improve the appearance of the input image 106 by modifying overexposed and/or underexposed regions of the input image 106, such that features of the input image 106 that are not visible or difficult to discern in the overexposed and/or underexposed regions of the input image 106 become more apparent. To illustrate, overexposed regions may appear darker, while underexposed regions may appear lighter. In addition, the modifications made by the exposure correction system 108 to the input image 106 do not detrimentally affect the appearance of regions of the input image 106 that are not overexposed or underexposed. Further, the exposure correction system 108 may be applied to images that include minimal, if any, overexposed and/or underexposed regions without negatively impacting the quality of the appearance of these images.

In particular implementations, the exposure correction system 108 may improve the appearance of the input image 106 by modifying the luminance values of certain regions of the input image 106. For example the exposure correction system 108 may perform an auto-level stretch operation 110. The auto-level stretch operation 110 may include modifying the luminance values of the input image 106 by modifying a histogram 112 associated with the input image 106. The histogram 112 may show the intensity of luminance values of the input image 106. In certain instances, luminance values of images may be measured on a scale from 0 to 255 and the histogram 112 shows the intensity of luminance values according to the 0 to 255 scale, where a luminance value of 0 corresponds to pure black and a luminance value of 255 corresponds to pure white. When the maximum and/or minimum luminance values for the input image 106 do not reach to the maximum and/or minimum ends of the range (i.e. 0 for the minimum value and 255 for the maximum value), the auto-level stretch operation 110 may be performed to stretch the histogram 112, such that the maximum luminance value on the histogram 112 is 255 and/or the minimum value on the histogram 112 is 0. Performing the auto-level stretch operation 110 may result in some improvement to the appearance of overexposed and/or underexposed regions of the input image 106.

To further improve the appearance of overexposed and/or underexposed regions of the input image 106, an exposure evaluation operation 114 may be executed. The exposure evaluation operation 114 may include, at 116, determining luminance modification parameters. The luminance modification parameters may be used to adjust luminance values of the input image 106. In some cases, a shadow luminance modification parameter may be determined to adjust luminance values in shadow portions of the input image 106 and a highlight luminance modification parameter may be determined to adjust luminance values in highlight portions of the input image 106. In certain instances, the shadow portions of the input image 106 have luminance values nearer to 0, the highlight portions of the input image 106 have luminance values nearer to 255, and the mid-tone portions of the input image 106 are in between the highlight and shadow portions. For example, in a black and white photograph, the mid-tone would be gray.

In an illustrative implementation, the luminance modification parameters are determined by segmenting the input image 106 into a number of regions. In particular, pixels of the input image 106 having the same or similar luminance values may be grouped together. In some instances, these groups may be referred to as "superpixels." After forming the superpixels of the input image 106, the exposure evaluation operation 114 may include determining a zone of each superpixel and grouping superpixels associated with the same zone. The zone of each superpixel may refer to a range of luminance values on a scale of luminance values. In certain situations, the luminance value range of 0 to 255 is divided into 11 zones. Each of the zones may be associated with a mean luminance value. Furthermore, the exposure evaluation operation 114 may include identifying regions of the input image associated with the sky and/or associated with faces. Superpixels associated with sky regions or facial regions may be grouped together and assigned to a respective zone.

After identifying an initial group of zones for each region of the input image 106, the exposure evaluation operation 114 may include determining optimal zones for each region of the input image 106. The optimal zones for each region of the input image 106 may correspond to the zone that provides an improved appearance for the features of the respective region. In particular implementations, the optimal zone for a region maximizes the appearance of features of the region, preserves the relative contrast between the region and neighboring regions, and avoids a reversal of contrast in the region.

After determining the optimal zone for each region, the exposure evaluation operation 114 may include calculating a shadow luminance modification parameter, a highlight luminance modification parameter, or both. The highlight luminance modification parameter and/or the shadow luminance modification parameter may be utilized in a shadow/highlight correction operation at 118 to improve the appearance of features of the input image 106. In an illustrative implementation, the shadow/highlight correction operation 118 may correspond to generating a non-linear function that indicates changes to the luminance values of the input image 106. For example, the non-linear function may include an S-shaped curve or an inverted S-shaped curve, such as the inverted S-shape curve 120 shown in FIG. 1. The inverted S-shape curve 120 shows output image luminance values (y-axis) in relation to input image luminance values (x-axis). Additionally, the shape of the inverted S-shaped curve 120 is based on the highlight luminance modification parameter $\phi_h$ and the shadow luminance modification parameter $\phi_s$. With respect to the inverted S-shape curve 120, the larger the highlight luminance modification parameter $\phi_h$, the larger the adjustment to the luminance values of the input image 106 in the highlight region and the larger the shadow luminance modification parameter $\phi_s$, the larger the adjustment to the luminance values of the input image 106 in the shadow region.

Modification of the luminance values of the input image 106 according to the inverted S-shaped curve 120 may produce a modified image 122. In some situations, the modified image 122 may be produced via further processing of the input image 106. To illustrate, after modifying the luminance values of the input image 106 according to the inverted S-shaped curve 120 to produce an intermediate image, the intermediate image may be further processed by adding in details from the original image that may not be apparent in the intermediate image. Additionally, any artifacts of the intermediate image, such as a halo associated with certain portions of the intermediate image and/or over-amplified dark/bright tones may be reduced before the modified image 122 is generated.

By automatically adjusting luminance values of an input image based on shadow luminance modification parameters and highlight luminance modification parameters that are calculated as described herein, the appearance of images may be improved without user interaction. Thus, the appearance of images captured by individuals may be improved without any special knowledge on the part of the user, either while capturing the image or in post-processing after the image is captured. Additionally, the amount of time devoted to producing images with improved appearances is minimal.

Figure 2:
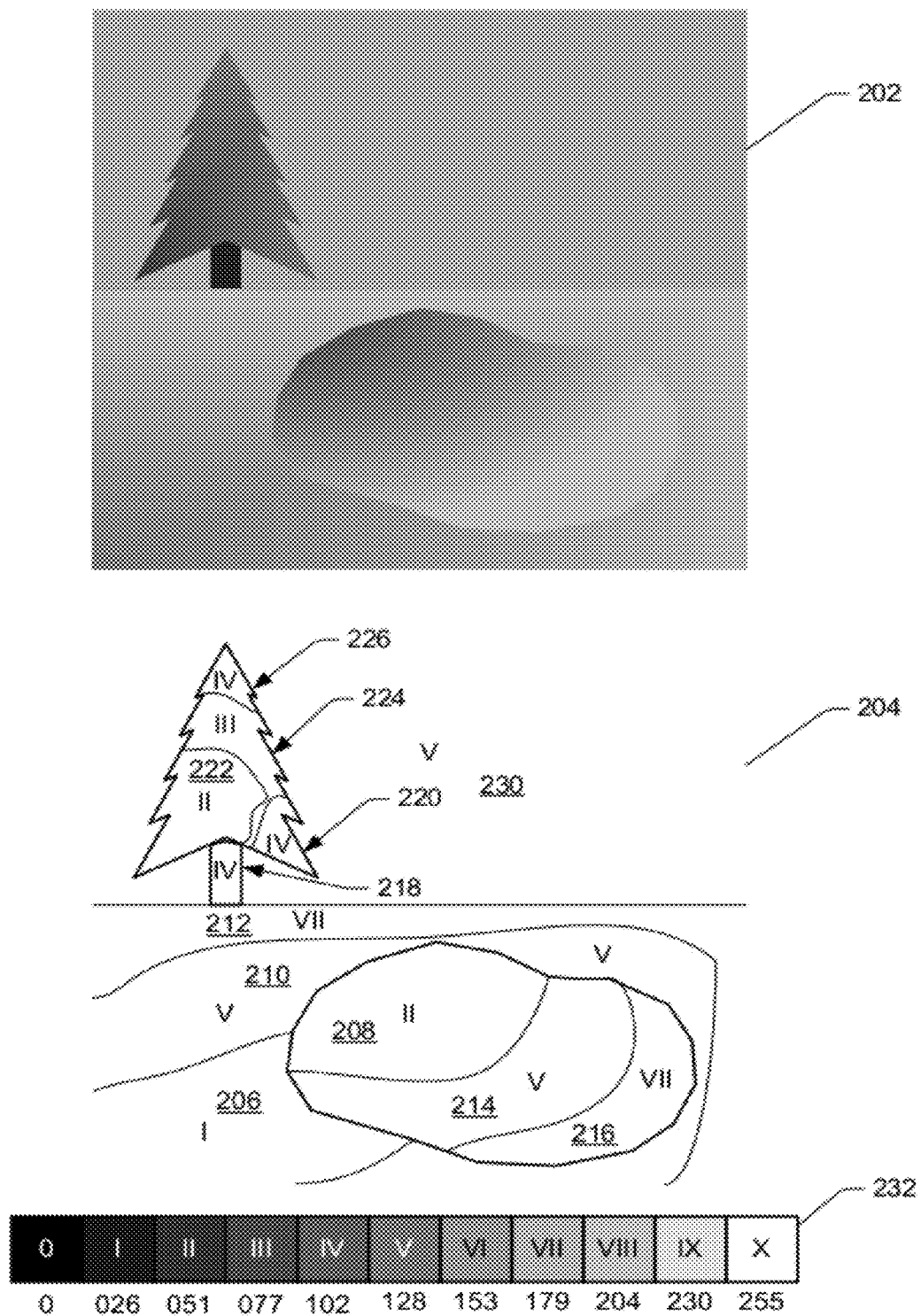
FIG. 2 illustrates an image that has been segmented into a number of regions and each region has been assigned a respective zone indicating a range of luminance values of the respective region.

FIG. 2 illustrates an image that has been segmented into a number of regions and each region has been assigned a respective zone indicating a luminance of the respective region. In particular, FIG. 2 includes an input image 202 and a segmented image 204 that includes a number of regions 206-230. Each of the regions 206-230 has been assigned a particular zone of a plurality of zones. Each of the zones is associated with a range of luminance values on a scale of luminance values 232. The pixels of each respective region 206-230 have been grouped together because of similarities between the luminance values of the pixels. For example, pixels associated with the region 216 shown in the input image 202 have been assigned to zone VII because these pixels have luminance values in the range associated with zone VII in the scale of luminance values 232.

Figure 3:
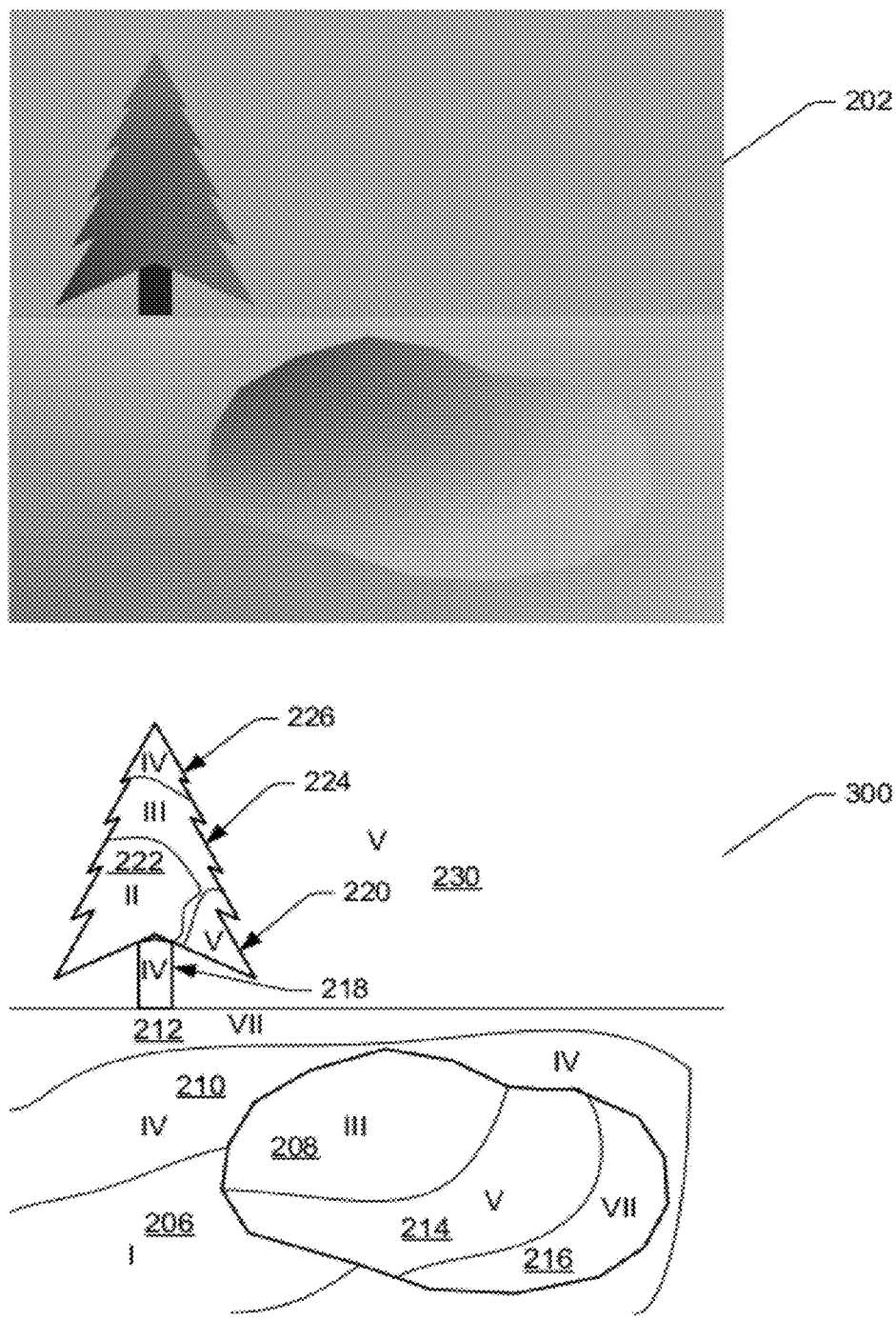
FIG. 3 illustrates the image of FIG. 2 with modifications to the respective zone assigned to some of the regions.

FIG. 3 illustrates the image 202 of FIG. 2 with the respective zone assigned to some of the regions modified. In particular, a modified segmented image 300 has been produced. The modified segmented image 300 shows the optimal zones assigned to the respective regions 206-230. The optimal zones of the regions 206-230 may be determined as described with respect to the exposure evaluation operation 114 of FIG. 1. In the illustrative example shown in FIG. 3, the respective zone associated with the regions 208, 210, and 220 have been modified from the original zone assigned to the regions 208, 210, and 220. Specifically, the region 208 has been modified from zone II to zone III, the region 210 has been modified from zone V to zone IV, and the region 220 has been modified from zone IV to zone V.

Figure 4:
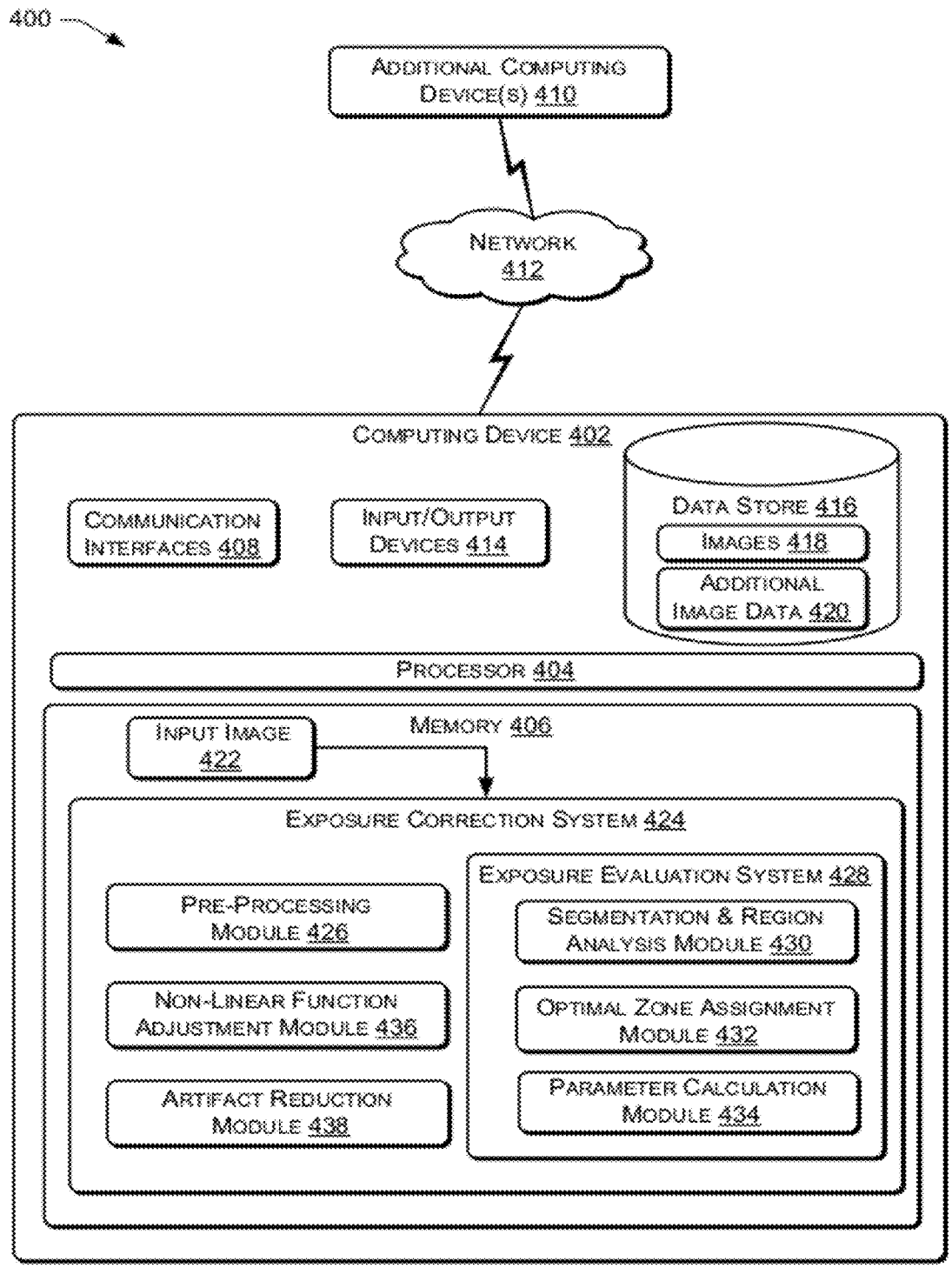
FIG. 4 illustrates a system to provide automatic correction of the exposure of images.

FIG. 4 illustrates a system 400 to provide automatic correction of the exposure of images. The system 400 includes a computing device 402, such as a laptop computer, a tablet computer, a smart phone, a mobile handset, a digital camera, a personal computer, a server, etc. Additionally, the computing device 402 includes one or more processors represented by the processor 404. The processor 404 may be configured to process data stored in association with computer-readable media. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by the computing device 402.

In contrast, communication media may embody computer readable instructions, data structures, program modules, or other data in a modulated data signal, such as a carrier wave, or other transmission mechanism. As defined herein, computer storage media does not include communication media.

The computing device 402 also includes memory 406 that is accessible to the processor 404. The memory 406 is an example of computer storage media. Further, the computing device 402 includes one or more communication interfaces 408 that may facilitate communication between the computing device 402 and other computing devices, such as additional computing devices 410. In particular, the communication interfaces 408 may include one or more wired network communication interfaces, one or more wireless communication interfaces, or both, to facilitate communication via one or more networks represented by network 412. The network 412 may be representative of any one or combination of multiple different types of wired and wireless networks, such as the Internet, cable networks, satellite networks, wide area wireless communication networks, wired local area networks, wireless local area networks, public switched telephone networks (PSTN), and the like.

Additionally, the computing device 402 may include input/output devices 414. The input/output devices 414 may include a keyboard, a pointer device, (e.g. a mouse or a stylus), a touch screen, one or more image capture devices (e.g. one or more cameras), one or more microphones, a display, speakers, and so forth. The computing device 402 also includes a data store 416, which is also an example of computer storage media. The data store 416 may store one or more images 418. In some cases, one or more of the images 418 may be captured via an image capture device of the computing device 402. In other situations, one or more of the images 418 may be received from the additional computing device 410 via the network 412. For example, the computing device 402 may be a personal computer or laptop computer that is coupled locally to the additional computing device 410 (e.g. a digital camera, smart phone, etc.) and the computing device 402 may receive one or more of the images 402 from the additional computing device 410. In another example, the computing device 402 may be a server computer that receives one or more of the images 418 remotely from the additional computing device 410 (e.g. a personal computer, laptop computer, phone, etc.) via the network 412.

The data store 418 may also store additional image data 420 that relates to the images 418. In certain situations, the additional image data 420 includes data indicating luminance values of one or more of the images 418. In a particular example, the additional image data 420 may include histogram data corresponding to one or more of the images 418, where the histogram data for each image 418 indicates luminance values with respect to intensity for a range of luminance values (e.g. 0 to 255). The additional image data 420 may include histogram data with respect to an entire image 418 and/or for one or more regions of an image 418. The additional image data 420 may also include data generated during an exposure correction process, such as data indicating edges of one or more of the images 418, zone assignments to regions of one or more of the images 418, and so forth.

In an illustrative implementation, the computing device 402 may be configured to provide an input image 422 to an exposure correction system 424. In some cases, the input image 422 may be captured via the computing device 402 and automatically processed by the exposure correction system 424 to make modifications to any overexposed and/or underexposed regions of the input image 422. In other situations, the input image 422 may be an image stored in the data store 418. In a further example, the input image 422 may be obtained from the additional computing device 410 for exposure correction via the exposure correction system 424. In certain situations, the exposure correction system 424 may be executed as part of an image modification application of the computing device 402. Furthermore, the exposure correction system 424 may be executed in response to an input from a user of the computing device 402 to conduct exposure correction of the input image 422.

The exposure correction system 424 includes a pre-processing module 426 that is executable by the processor 404 to apply one or more exposure correction techniques as pre-processing operations. For example, the pre-processing module 426 may execute an auto-level stretch operation with respect to the input image 422. To illustrate, histogram data associated with the input image 422 may indicate a range of luminance values for the input image 422 from 25 to 243 on a scale of 0 to 255. An auto-level stretch operation performed by the pre-processing module 426 may modify the luminance values of the input image 422 such that the minimum luminance value is 0 and the maximum luminance value is 255. As a result, the appearance of some overexposed and/or underexposed regions may be improved because the intensity of some dark pixels and some bright pixels is reduced by the auto-level stretch operation.

In another example, the pre-processing module 426 may perform a histogram equalization operation. The histogram equalization operation may spread out luminance values with the highest intensity over a greater range of luminance values, thereby reducing the intensity of at least some luminance values. Consequently, regions of the input image having a lower contrast will be associated with a higher contrast, which can improve the appearance of at least some overexposed and/or underexposed regions of the input image 422.

The exposure correction system 424 also includes an exposure evaluation system 428 that is executable by the processor 404 to execute further operations to improve the exposure of the input image 422. For example, the exposure evaluation system 428 includes a segmentation and region analysis module 430 that is executable by the processor 404 to segment the input image 422 into a number of different regions. In an illustrative implementation, the segmentation and region analysis module 430 may partition the input image 422 into a number of groups of pixels referred to as superpixels.

The segmentation and region analysis module 430 may also determine a zone associated with each superpixel. The zone associated with each superpixel may represent a range of luminance values on a scale of luminance values. In some instances, the range of luminance values may be 0 to 255 and divided into 11 regions with region 0 representing pure black and region 11 representing pure white. The segmentation and region analysis module 430 may also merge neighboring superpixels associated with the same zone to form regions of the input image 422. Superpixels may also be grouped together when the superpixels are associated with particular characteristics of the input image 422. To illustrate, the segmentation and region analysis module 430 may identify superpixels of the input image 422 associated with features of the sky and group these superpixels into a sky region. In another illustration, the segmentation and region analysis module 430 may identify superpixels of the input image 422 associated with facial features and group together these superpixels into one or more facial regions. The segmentation and region analysis module 430 may assign one or more zones to respective sky regions and facial regions.

The exposure evaluation system 428 also includes an optimal zone assignment module 432 that is executable by the processor 404 to modify one or more zones of the input image 422. The optimal zone assignment module 432 may determine that a particular zone of the input image 422 is to be modified in order to improve the appearance of the input image 422. In a particular implementation, the optimal zone assignment module 432 maximizes the visible details of the input image 422 and preserves the relative contrast between neighboring regions in order to determine the optimal zone for each region of the input image 422.

The optimal zone assignment module 432 may maximize the visible details of the input image 422 by generating one or more gamma-corrected images of the input image 422. The gamma-corrected images may be generated by applying an exponential function on the order of a gamma factor to the input image 422 in order to modify luminance values of the input image 422. In some situations, at least one of the gamma-corrected images includes features that appear brighter than the input image 422. In these situations, the gamma factor is less than 1, where the input image 422 has a gamma factor of 1. In other situations, at least one of the gamma-corrected images includes features that appear darker than the input image 422. In these situations, the gamma factor is greater than 1. In a particular exemplary implementation, the optimal zone assignment module 432 may generate gamma-corrected images having a gamma factor of 0.5 and 2.0.

After generating the gamma-corrected images, the optimal zone assignment module 432 may detect the edges of the input image 422 and the one or more gamma-corrected images generated from the input image 422. The edge detection performed by the optimal zone assignment module 432 may identify points of the input image 422 and the one or more gamma-corrected images where the luminance changes or has discontinuities. The optimal zone assignment module 432 may utilize the edges detected with respect to the input image 422 and the one or more gamma-corrected images to produce respective edge maps showing the edges of the input image 422 and the edges of the one or more gamma-corrected images.

The optimal zone assignment module 432 may utilize the edges detected for the input image 422 and the one or more gamma-corrected images to measure the visible details of these respective images. In an illustrative implementation, the edges of the input image 422, the edges of a gamma-corrected image with a gamma factor less than 1, and the edges of a gamma-corrected image with a gamma factor greater than 1, may be represented by respective edge sets $\Omega_1$, $\Omega_s$, and $\Omega_l$. The visible details of the shadow regions of the input image 422 and the highlight regions of the input image 422 may be calculated using the edge differences between the input image 422, the gamma-corrected image with a gamma factor less than one, and the gamma-corrected image with a gamma factor greater than 1. To illustrate, the edge differences in the shadow region may be represented by $\Omega_{diff}^{s}=\Omega_s-\Omega_s\cap\Omega_l$ and the edge differences in the highlight region may be represented by $\Omega_{diff}^{H}=\Omega_l-\Omega_s\cap\Omega_l$. The relative visibility of details in the shadow region $V^s$ and highlight region $V^h$ of the input image 422 may be calculated according to equation (1):

$$V^s = \frac{\text{card}(\Omega_{diff}^S)}{\text{card}(\Omega_{all})}, V^h = \frac{\text{card}(\Omega_{diff}^H)}{\text{card}(\Omega_{all})}, \quad (1)$$

where card(•) indicates the number of pixels associated with the detected edges in a set and $\Omega_{all}=\Omega_1\cup\Omega_s\cup\Omega_l$.

Further, the relative contrast between neighboring regions may be calculated based on differences between luminance values of the neighboring regions. In particular, the optimal zone assignment module 432 may generate or retrieve from the data store 416 histograms showing luminance values with respect to intensity for a first region of the input image 422 that is adjacent to a second region. The optimal zone assignment module 432 may determine a distance between the mean luminance value of the first region and the mean luminance value of the second region. In a particular example, the first region may be assigned to zone II and have a mean luminance value of 51 and the second region may be assigned to zone VII and have a mean luminance value of 179. In this example, the difference between the mean luminance values of the first region and the second region is 128. The optimal zone assignment module 432 may calculate the relative contrast between the first region and the second region by shifting the respective histograms of the first region and the second region a minimum distance that maximizes the intersection of the luminance values of the first region and the second region. To illustrate, the optimal zone assignment module 432 may shift the histogram of the first region and the histogram of the second region, such that some of the higher luminance values of the first region intersect with some of the lower luminance values of the second region. In shifting the histograms of the first region and the second region, the first region and the second region may be associated with different zones. In one example, the first region may be assigned to zone III after the shift and the second region may be assigned to zone VI after the shift. Thus, in a particular example, the mean luminance values may have changed to 77 for the first region and 153 for the second region with a distance between them of 76.

After measuring the visible details of the input image 422 and measuring the relative contrast of the input image 422, the optimal zone assignment module 432 may determine optimal zones for each region of the input image 422 that may be different from the zones initially assigned to each region. In a particular implementation, the optimal zone assignment module may determine the optimal zones for the regions of the input image 422 by minimizing a Markov Random Fields (MRF) energy function with respect to the measurement of the visible details and the measurement of the relative contrast of the input image 422. The MRF energy function $E(Z)$ may be given by Equation (2):

$$Z^* = \arg\min_Z E(Z) = \arg\min_Z \left( \sum_i E_i + \lambda \sum_{i,j} E_{i,j} \right), \quad (2)$$

where the optimal labels $Z=\{z_i\}$ with $z_i$ being the desired zone for a particular region. In addition, $E_i$ is a data term for an individual region i, $E_{i,j}$ is the pairwise term between two adjacent regions i and j, and $\lambda$ is a weighting factor. The weighting factor $\lambda$ may be estimated by summing the data terms $E_i$ and the pairwise terms $E_{i,j}$ across each combination of zone candidates and setting $\lambda$ equal to the sum of the ratio of data terms $E_i$ and the pairwise terms $E_{i,j}$. $E_i$ and $E_{i,j}$ may be given in the probability form $E_i=-\log(P(i))$ and $E_{i,j}=-\log(P(i,j))$. The likelihood $P(i)$ of a region is measured by the visibility of details V, the region size C (normalized by the overall size of the image), and the semantic importance $\theta_i$ (measured by the percentage of semantic area) and is given by equation (3):

$$P(i)=V_i \cdot C_i \cdot \theta_i \cdot \rho(|z_i - \hat{z}_i|), \quad (3)$$

where $\rho(\bullet)$ is a sigmoid function $\rho(t)=1/(1+\exp(-t))$ and $|z_i - \hat{z}_i|$ is the deviation from the initial zone $\hat{z}_i$. $V^s$ and $V^h$ may be used to calculate $P_i$ in the shadow zone regions and highlight zone regions, respectively.

The coherence $P(i,j)$ is defined by the change of relative contrast between two regions from the initial relative contrast, that is the initial distance between the mean luminance values of the histograms of the regions, $\hat{d}_{i,j}$ to a new relative contrast $d_{i,j}$. The coherence $P(i,j)$ is denoted by equation (4):

$$P(i,j)=C_j \cdot \mathcal{G} (d_{i,j} - \hat{d}_{i,j}), \quad (4)$$

where $\mathcal{G}(\bullet)$ is a zero-mean Gaussian function with a specified variance (e.g. 0.15). The Gaussian function $\mathcal{G}$ may minimize any dramatic change of the relative contrast. The weight $C_j$ is used such that relatively smaller regions contribute less to the coherence $P(i,j)$.

In some cases, the optimal zone assignment module 432 may apply one or more constraints when minimizing the MRF energy function $E(Z)$ to determine the optimal zones for the regions of the input image 422. For example, the one or more constraints may include restricting changes in the zone of a region across zone V, regions associated with zone V remain unchanged, the zone change for regions assigned to the same initial zone should be the same for each region (e.g. each region assigned to zone II is modified to zone III), or combinations thereof. Additionally, in some instances, to obtain a global optimization of the MRF energy function $E(Z)$, an iterative brute force searching method may be used to consider every combination of zone candidates for each region.

The exposure correction system 428 also includes a parameter calculation module 434 that is executable by the processor 404 to calculate luminance modification parameters that can be used to modify the luminance of certain portions of the input image 422 in order to improve the appearance of the input image 422. In particular, the luminance modification parameters may be used to improve the appearance of overexposed and/or underexposed regions of the input image 422. In an illustrative implementation, the luminance modification parameters may be calculated such that the zone associated with each region of the input image 422 is moved as much as possible toward its respective optimal zone as calculated by the optimal zone assignment module 432. To calculate the shadow and highlight luminance modification parameters, $\phi_s$ and $\phi_h$, the original exposure of each region is calculated by the intensity mean $e_i=\Sigma I_n/c_i$, where $I_n$ is the original intensity and $c_i$ is the region size. Accordingly, the shadow luminance modification parameter $\phi_s$ can be calculated according to $\phi_s=(\mu_i-e_i)\cdot c_i/\Sigma f\Delta(I_n)$, where $\mu_i$ is the target exposure corresponding to its respective zone value. The relationship between a zone value and its respective exposure is shown in 232 of FIG. 2. Additionally, $f\Delta(I_n)$ is the luminance change after shadow or highlight luminance modification. The mathematical form of $f\Delta(I_n)$ is shown below in Equation (5). In addition, the highlight luminance modification parameter may be calculated according to $\phi_h=(e_i-\mu_i)\cdot c_i/\Sigma f\Delta(1-I_n)$. Once the shadow and/or highlight luminance modification parameters are calculated for each region, the weighted average is taken with respect to the shadow and/or luminance modification parameters for each region with the relative region size $c_i$ serving as the weight. An overall shadow luminance modification parameter of the input image 422 may be calculated from the weighted average of the region shadow luminance modification parameters and an overall highlight luminance modification parameter of the input image 422 may be calculated from the weighted average of the region highlight luminance modification parameters.

The shadow and highlight luminance modification parameters of the input image 422 calculated by the parameter calculation module 434 may be utilized by a non-linear function adjustment module 436 to generate a non-linear function that maps the initial luminance values for pixels of the input image 422 with modified luminance values for the pixels. The non-linear function may be characterized as an S-shaped curve or an inverted S-shaped curve and may be given by equation (5):

$$f(x)=x+\phi_s \cdot f\Delta(x) - \phi_h \cdot f\Delta(1-x), \quad (5)$$

where x and f(x) are the normalized input pixel luminance and the modified pixel luminance, respectively. Additionally, $f\Delta(x)$ is an increment function defined by $f\Delta(x)=\kappa_1 x \exp(-\kappa_2 x^{\kappa_3})$, where $\kappa_1$ controls the modified maximum luminance change amplification of the shadows or highlights, and $\kappa_2$ and $\kappa_3$ control the modified tone range of the shadows or highlights. In an illustrative example, $\kappa_1=5$, $\kappa_2=14$, and $\kappa_3=1.6$. The non-linear function adjustment module 436 may apply the shadow and highlight luminance modification parameters to the non-linear function, such as the S-curve function of Equation (5), to produce an output image based on the input image 422.

In some instances, the non-linear function adjustment module 436 may add features to the output image to produce a modified output image. In a particular implementation, after generating the output image utilizing the non-linear function, the non-linear function adjustment module 436 may fuse the output image with a local details image to produce the modified output image. To illustrate, the input image 422 may be designated as I, the image generated by applying the shadow and highlight parameters to the non-linear function may be designated as f(I), and a filtered version of the input image 422 that is produced by applying one or more low-pass filters (e.g. Gaussian filter) may be referred to as $I_F$. A local details image, $\Delta I$, that can be used to add features to the intermediate image may be produced by taking the difference between the input image 422 and the filtered version of the input image. Thus, $\Delta I = I - I_F$, and in an illustrative example, the modified output image $\hat{I}$ may be produced via equation (6):

$$\hat{I}=f(I)+[2 \cdot f(I)(1-f(I))] \cdot \Delta I, \quad (6)$$

where the term $[2 \cdot f(I)(1-f(I))]$ may serve to add features to certain portions of the intermediate output image. In particular cases, the number of features added to the mid-tone range is greater than the number of features added in the shadow range or highlight range. Thus, in equation (6), the term $f(I)(1-f(I))$ reaches a maximum in the mid-tone range.

When the input image 422 is a black and white image, the operations performed by the exposure correction system 424 are performed with respect to the luminance channel of the input image 422. When the input image 422 is a color image, the operations of the exposure correction system 424 may be performed with respect to the luminance channel of the input image 422 and the color channel of the input image 422. For example, the non-linear function adjustment module 436 may separate the luminance channel of the input image 422 from the color channel. The non-linear function adjustment module 436 may also determine a ratio between luminance values of pixels of the input image 422 and luminance values of pixels of the modified version of the input image 422. The non-linear function adjustment module 436 may then apply the ratio determined with respect to the luminance channel and apply the ratio on the color channel. Thus, the pixels of the input image 422 on the color channel may be modified according to the ratio to produce the modified version of the input image 422.

In some scenarios, an output image may have some artifacts, such as a halo effect associated with some portions of the output image and/or the overamplification of some of the darkest and/or brightest tones of the output image. In these scenarios, an artifact reduction module 438 of the exposure correction system 424 may be executable by the processor 404 to reduce the artifacts of the output image. For example, the artifacts reduction module 438 may apply a particular filter to the output image to reduce portions of the output image associated with the halo effect. In some cases, the filter applied to the output image is applied instead of the Gaussian filter that may be used to produce the filtered version of the input image as described above. In an illustrative implementation, the particular filter may include a guided filter that is a linear transform of a guidance image, where the guidance image may be the input image or another image. To minimize or eliminate overamplification artifacts, the artifact reduction module 438 may blend the output image with the input image 422 using a near-black confidence map when correcting overamplification of dark tones and using a near-white confidence map when correcting overamplification of bright tones. The confidence value for the near-black confidence map may be measured by the distance between the minimum of Red-Green-Blue (RGB) colors in each pixel and pure black and the confidence value for the near-white confidence map may be measured by the distance between the maximum of RGB colors in each pixel and pure white. The distance may be measured using a Gaussian function with an intensity value of 0.05 considered as pure black and an intensity value of 0.95 considered as pure white when the image intensity values are normalized to [0,1].

Figure 5:
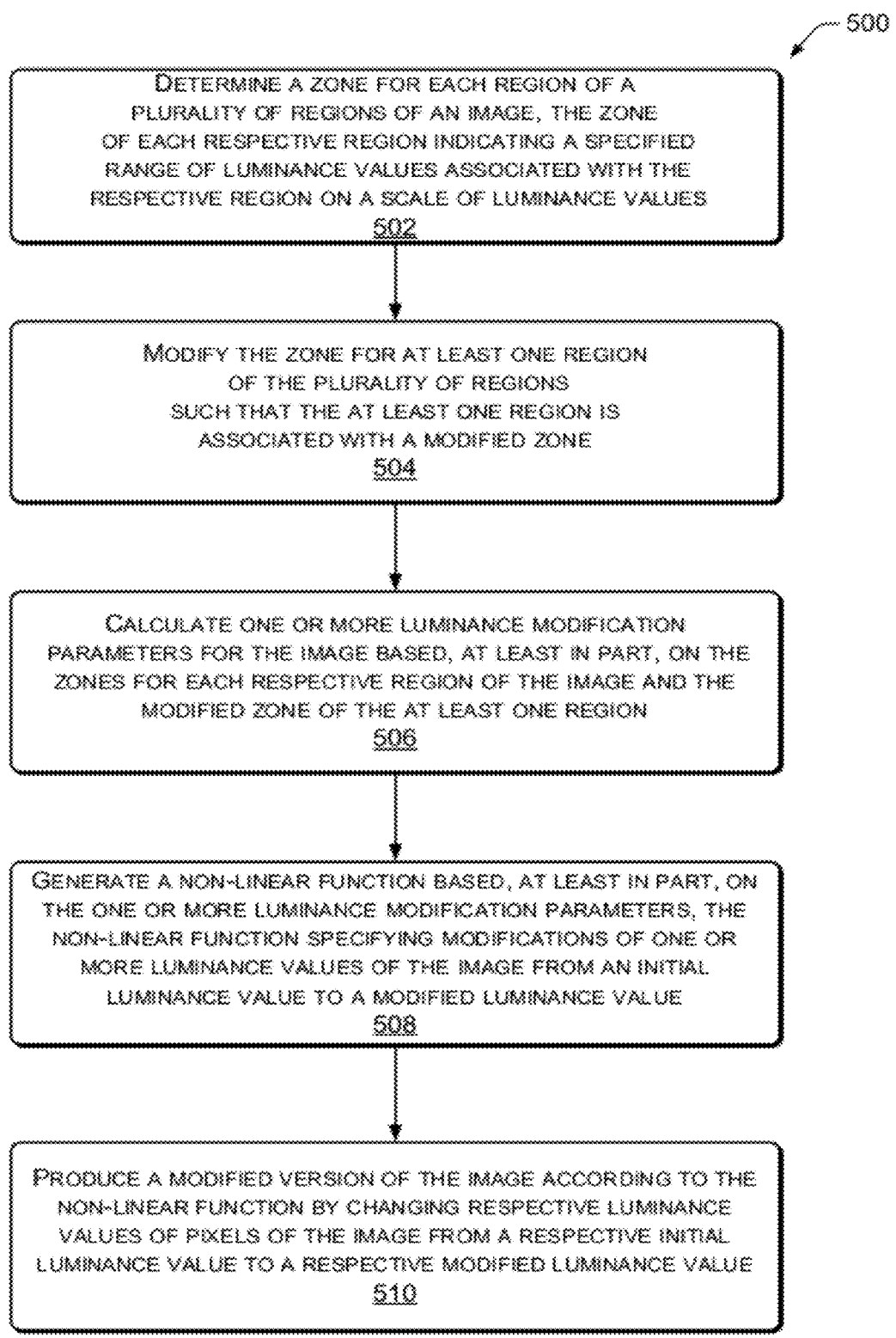
FIG. 5 illustrates a process to produce a modified image with corrected exposure by calculating luminance modification parameters that are applied to a non-linear function that characterizes the luminance of shadow, mid-tone, and highlight regions of the image.
Figure 6:
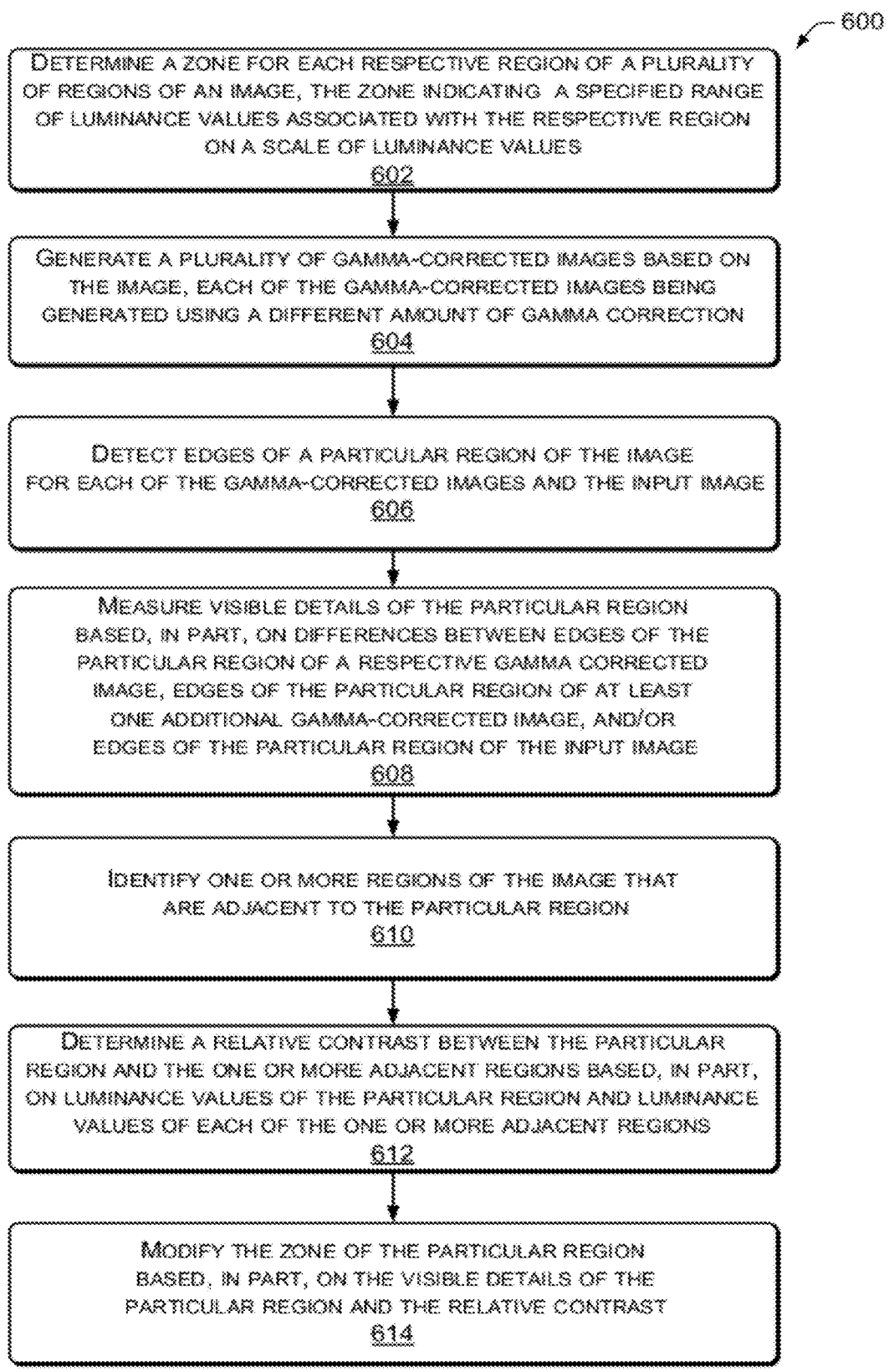
FIG. 6 illustrates a process to modify a range of luminance values assigned to a region of an image.
Figure 7:
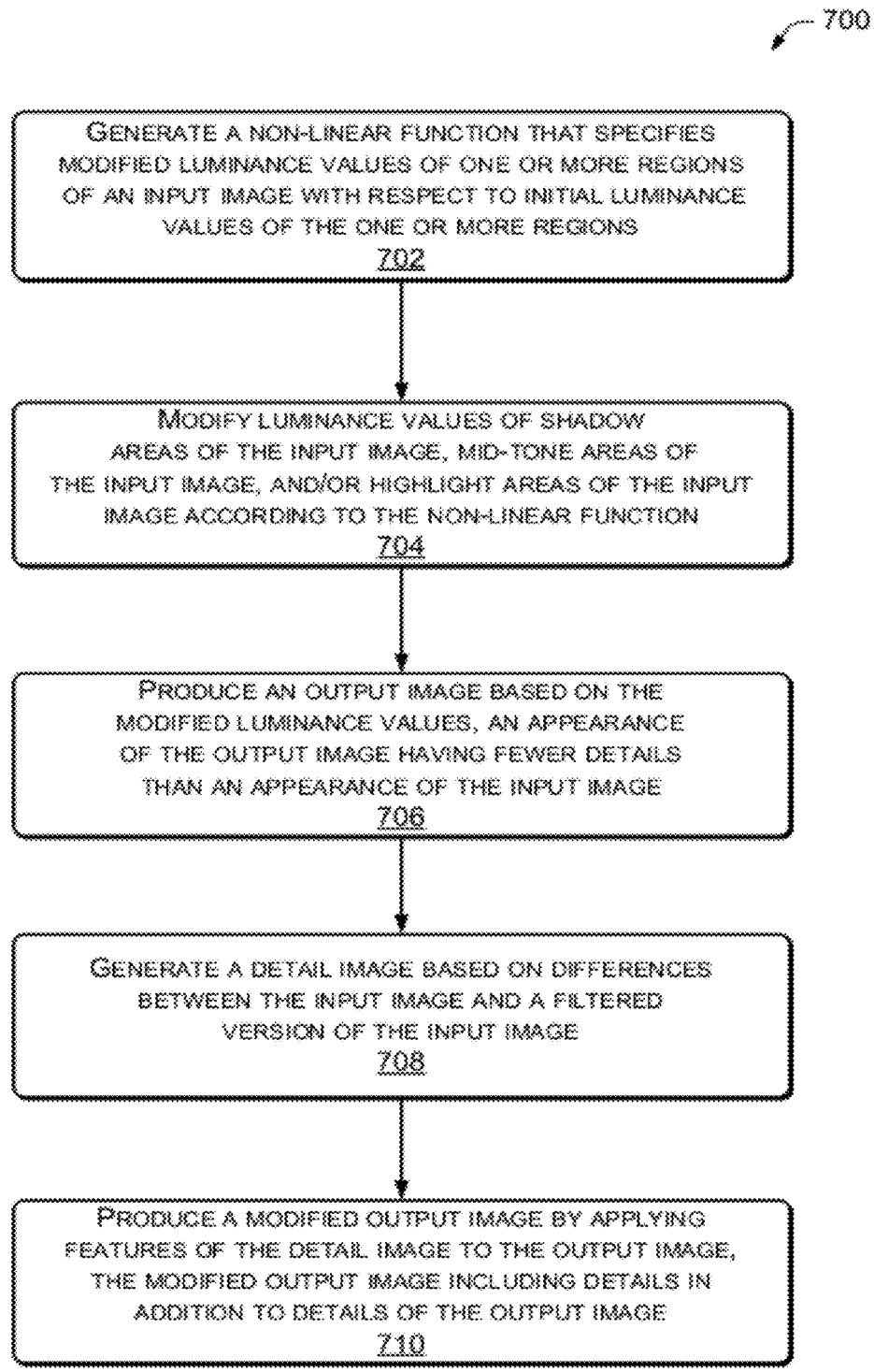
FIG. 7 illustrates a process to produce an output image according to a non-linear function and to produce a modified output image by adding features to the output image.

FIGS. 5-7 show methods 500-700, respectively, to provide automatic correction of the exposure of images. The methods 500-700 are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 5 illustrates a process 500 to produce a modified version of an input image with corrected exposure by calculating luminance modification parameters that are applied to a non-linear function that characterizes the luminance of shadow, mid-tone, and highlight regions of the input image. In particular, at 502, the process 500 includes determining a zone for each region of a plurality of regions of the image. The zone of each respective region indicates a specified range of luminance values associated with the respective region on a scale of luminance values. For example, item 232 of FIG. 2 indicates a scale of luminance values from 0 to 255 that is divided into 11 zones from 0 to X. In particular implementations, the pixels of the image may be grouped according to their respective luminance values and groups of pixels having luminance values that fall within a particular range of luminance values may be grouped to produce a region that is associated with a corresponding zone. In some cases, pixels of the image may be associated with sky features or facial features. In these cases, the pixels associated with the sky features may be grouped into a particular region and pixels associated with facial features may be grouped into particular regions.

At 504, the zone for at least one region of the plurality of regions is modified such that the at least one region is associated with a modified zone. For example, luminance values of a region of the image may be changed from luminance values included in a range of luminance values associated with an initial zone of the region to luminance values included in a different range of luminance values associated with the modified zone of the region.

At 506, the process 500 includes calculating one or more luminance modification parameters for the image based, at least in part, on the zones for each respective region of the image and the modified zone of the at least one region. In some cases, shadow luminance modification parameters may be generated and highlight luminance modification parameters may be generated. The shadow luminance modification parameters may indicate changes to luminance values of pixels in shadow regions of the image and highlight luminance modification parameters may indicate changes to luminance values of pixels in highlight regions of the image. In an illustrative implementation, shadow luminance modification parameters and/or highlight luminance modification parameters may be generated for each region of the image. An overall shadow luminance modification parameter and an overall highlight luminance modification parameter may be calculated based on the respective shadow luminance modification parameters of each region and the respective highlight luminance modification parameters of each region. In a particular example, a weighted average of the highlight luminance modification parameters of the regions of the image may be used to calculate the overall highlight luminance modification parameter and a weighted average of the shadow luminance modification parameters of the regions may be used to calculate the overall shadow luminance modification parameter. In some cases, the weight assigned to the shadow and/or highlight modification parameters of the respective regions is based on a size of the respective regions.

At 508, a non-linear function may be generated based, at least in part, on the one or more luminance modification parameters. The non-linear function may specify modifications to one or more luminance values of the image from an initial luminance value to a modified luminance value. In some situations, the non-linear function may represent an S-shaped curve, while in other cases, the non-linear function may represent an inverted S-shaped curve. At 510, the process 500 includes producing a modified version of the image according to the non-linear function. The modified version of the image is produced by changing respective luminance values of pixels of the image from a respective initial luminance value to a respective modified luminance value. In an illustrative example, the non-linear function may specify that pixels having a luminance value of 27 in the input image would be modified to have a value of 42. Thus, the respective luminance values of pixels having an initial luminance value of 27 in the input image are modified to have a luminance value of 42 in the modified version of the input image.

FIG. 6 illustrates a process 600 to modify a range of luminance values assigned to a region of an image. At 602, the process 600 includes determining a zone for each respective region of a plurality of regions of an image. The zone of each respective region indicates a specified range of luminance values associated with the respective region on a scale of luminance values. At 604, the process 600 includes generating a plurality of gamma-corrected images based on the image. Each of the gamma-corrected images is generated by applying a different amount of gamma correction to the image. The amount of gamma correction applied to the image may produce gamma-corrected images that emphasize different features of the image.

At 606, the process 600 includes detecting edges of a particular region of the image for each of the gamma-corrected images and for the input image. The edges of the particular region may indicate changes or discontinuities in the luminance of the particular region. At 608, visible details of the particular region are measured. The visible details may be measured based, at least in part, on differences between edges of the particular region of a respective gamma-corrected image, edges of the particular region of at least one additional gamma-corrected image, and/or edges of the input image.

At 610, the process 600 includes identifying one or more regions of the image that are adjacent to the particular region of the image, and at 612, a relative contrast between the particular region and the one or more regions adjacent to the particular region is determined. The relative contrast may be determined based, at least in part, on luminance values of the particular region and luminance values of each of the one or more regions adjacent to the particular region. In certain instances, determining the relative contrast may involve histograms of the particular region and the adjacent regions. The respective histogram of each region may indicate the luminance values of the respective region with respect to an intensity associated with each luminance value. When determining the relative contrast, a distance between a mean luminance value of the particular region and the mean luminance value of each of the adjacent regions may be determined. In a particular implementation, the relative contrast is determined by identifying a minimum distance to shift the histogram of the particular region and the histogram of a respective adjacent region such that the intersection of the luminance values of the particular region and the luminance values of the adjacent region are maximized.

At 614, the zone of the particular region is modified based, at least in part, on the visible details of the particular region and the relative contrast. In some situations, the zone of the particular region may be modified to minimize a Markov Random Fields energy function that includes a term associated with the visible details of the particular region and a term associated with the relative contrast. Additionally, certain constraints may be applied when modifying zones of regions of the image. For example, modifying the zone of regions having luminance values in a specified zone may be prohibited. Thus, in some cases, regions associated with a mid-tone zone, such as V in the scale of zones indicated by item 232 of FIG. 2, may be prohibited from being modified. In another example, each region associated with a particular zone may be modified in the same way. To illustrate, luminance values of each region associated with zone IV may be changed to luminance values associated with zone III.

FIG. 7 illustrates a process 700 to produce an output image according to a non-linear function and to produce a modified output image by adding features to the output image. At 702, the process includes generating a non-linear function that specifies modified luminance values of one or more regions of an input image with respect to initial luminance values of the one or more regions. At 704, the process 700 includes modifying luminance values of shadow areas of the input image, mid-tone areas of the input image, and/or highlight areas of the input image according to the non-linear function.

At 706, an output image is produced based on the modified luminance values. The appearance of the output image may have fewer details that an appearance of the input image. For example, some darker regions or overexposed regions of the input image may appear lighter in the output image. In addition, brighter regions of the input image may appear mid-gray in the output image, and thus, the mid-tone contrast of the output image may be reduced. At 708, the process 700 includes generating a detail image based on differences between the input image and a filtered version of the input image. Further, at 710, a modified output image is produced by applying features of the detail image to the output image. The modified output image may include details in addition to the details of the output image. In this way, some of the features of the input image may be added back into the output image.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
one or more processors;
memory accessible to the one or more processors, the memory storing:
a segmentation and region analysis module executable by the one or more processors to determine a zone for each region of a plurality of regions of an image, the zone of each respective region indicating a specified range of luminance values associated with the respective region on a scale of luminance values;
an optimal zone assignment module executable by the one or more processors to modify the zone for at least one region of the plurality of regions such that the at least one region is associated with a respective modified zone;
a parameter calculation module executable by the one or more processors to calculate one or more luminance modification parameters for the image based, at least in part, on the zones for each respective region of the image and the respective modified zone of the at least one region; and
a non-linear function adjustment module executable by the one or more processors to:
generate a non-linear function based, at least in part, on the one or more luminance modification parameters, the non-linear function specifying modifications of one or more luminance values of the image from an initial luminance value to a modified luminance value; and
produce a modified version of the image according to the non-linear function by changing respective luminance values of pixels of the image from a respective initial luminance value to a respective modified luminance value.

2. The apparatus as recited in claim 1, further comprising a pre-processing module executable by the one or more processors to perform an auto-level stretch operation by adjusting a minimum luminance value of the image to a minimum luminance value on the scale of luminance values, adjusting a maximum luminance value of the image to a maximum luminance value on the scale of luminance values, or both.

3. The apparatus as recited in claim 1, wherein the one or more luminance modification parameters includes a shadow luminance modification parameter and a highlight luminance modification parameter, the shadow luminance modification parameter indicating changes to pixels in shadow regions of the image and the highlight luminance modification parameter indicating changes to pixels in highlight regions of the image.

4. The apparatus as recited in claim 1, wherein calculating the one or more luminance modification parameters for the image includes calculating at least one respective luminance modification parameter for each of the respective regions of the image.

5. The apparatus as recited in claim 4, wherein the parameter calculation module is further executable by the one or more processors to calculate an overall shadow luminance modification parameter based, at least in part, on a weighted average of respective shadow luminance modification parameters for each respective region of the image and an overall highlight luminance modification parameter based, at least in part, on a weighted average of respective highlight luminance modification parameters for each respective region of the image.

6. The apparatus as recited in claim 5, wherein a weight given to each respective shadow luminance modification parameter and a weight given to each respective highlight luminance modification parameter is based, at least in part, on a size of each respective region.

7. The apparatus as recited in claim 1, wherein the segmentation and region analysis module is further executable by the one or more processors to:
segment the pixels of the image to produce a number of groups of pixels of the image;
assign a particular zone to each of the groups of pixels; and
combine respective groups of pixels associated with the same zone to produce the plurality of regions of the image.

8. The apparatus as recited in claim 7, wherein the segmentation and region analysis module is further executable by the one or more processors to:
identify portions of the image including facial features, identify portions of the image including sky features, or both;
combine the respective pixel groups of the image that include the facial features to form one or more facial regions of the image; and
combine the respective pixel groups of the image that include the sky features to form a sky region of the image.

9. A method comprising:
determining, by a computing device including one or more processors, a zone for each respective region of a plurality of regions of an image, the zone indicating a specified range of luminance values associated with the respective region on a scale of luminance values;
generating, by the computing device, a plurality of gamma corrected images based on the image, each of the plurality of gamma corrected images being generated using a different amount of gamma correction;
detecting, by the computing device, edges of a particular region of the image for each of the gamma corrected images and for the input image;
measuring, by the computing device, visible details of the particular region based, at least in part, on differences between edges of the particular region associated with a respective gamma-corrected image, edges of the particular region associated with at least one additional gamma-corrected image, edges of the particular region associated with the input image, or a combination thereof;
identifying, by the computing device, an additional region of the image that is adjacent to the particular region;
determining, by the computing device, a relative contrast between the particular region and the additional region based, at least in part, on luminance values of the particular region and luminance values of the additional region; and modifying the zone of the particular region based, at least in part, on the visible details of the particular region and the relative contrast.

10. The method as recited in claim 9, further comprising generating a histogram for each respective region of the image, the histogram for each respective region indicating luminance values of the respective region with respect to an intensity associated with each luminance value of the respective region.

11. The method as recited in claim 10, wherein determining the relative contrast between the particular region and the additional region includes:
    determining a distance between a mean luminance value of the particular region and a mean luminance value of the additional region; and
    determining a minimum distance to shift the histogram of the particular region and the respective histogram of the additional region such that an intersection between the luminance values of the particular region and the luminance values of the additional region are maximized.

12. The method as recited in claim 9, wherein the zone of the particular region is modified to minimize a Markov Random Fields energy function including a term associated with the visible details of the particular region and a term associated with the relative contrast.

13. The method as recited in claim 9, further comprising determining an optimal zone for the particular region that is different from the zone of the particular region, the optimal zone being associated with a particular range of luminance values that is different from the specified range of luminance values of the particular region.

14. The method as recited in claim 13, wherein modifying the zone of the particular region includes changing the luminance values of the particular region from the luminance values of the specified range of luminance values associated with the zone of the particular region to luminance values of the particular range of luminance values associated with the optimal zone.

15. The method as recited in claim 13, further comprising:
    identifying one or more regions of the image associated with the same zone as the particular region; and
    assigning the optimal zone of the particular region to each of the one or more regions.

16. The method as recited in claim 9, wherein modification of regions associated with a specified zone is prohibited.

17. One or more computer storage media devices including instructions that, when executed by a processor, perform operations comprising:
    generating a non-linear function that specifies modified luminance values of one or more regions of an input image with respect to initial luminance values of the one or more regions;
    modifying luminance values of shadow areas of the input image, mid-tone areas of the input image, highlight areas of the input image, or a combination thereof, according to the non-linear function;
    producing an output image based on the modified luminance values, an appearance of the output image having fewer details than an appearance of the input image;
    generating a detail image based on differences between the input image and a filtered version of the input image; and
    producing a modified output image by applying features of the detail image to the output image, the modified output image including details in addition to those of the output image.

18. The one or more computer storage media devices as recited in claim 17, wherein the non-linear function specifies an S-shaped curve or an inverted S-shaped curve.

19. The one or more computer storage media devices as recited in claim 17, wherein the operations further comprise:
    applying a particular filter to the modified output image to reduce halo artifacts of the modified output image; and
    blending the modified output image with the input image using a near-black confidence map to reduce overamplified dark tones, using a near-white confidence map to reduce overamplified bright tones, or both.

20. The one or more computer storage media devices as recited in claim 17, wherein a greater number of features of the detail image are added to mid-tone regions of the output image than a number of features added to shadow regions of the output image and a number of features added to highlight regions of the output image.

* * * * *